(12) United States Patent
Tomita

(10) Patent No.: US 12,515,562 B2
(45) Date of Patent: Jan. 6, 2026

(54) NON-CONTACT POWER SUPPLY SYSTEM AND TRANSPORTATION SYSTEM

(71) Applicant: MURATA MACHINERY, LTD., Kyoto (JP)

(72) Inventor: Hiroyasu Tomita, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 530 days.

(21) Appl. No.: 18/030,099

(22) PCT Filed: Sep. 2, 2021

(86) PCT No.: PCT/JP2021/032318
§ 371 (c)(1),
(2) Date: Apr. 4, 2023

(87) PCT Pub. No.: WO2022/074974
PCT Pub. Date: Apr. 14, 2022

(65) Prior Publication Data
US 2023/0365027 A1    Nov. 16, 2023

(30) Foreign Application Priority Data
Oct. 6, 2020    (JP) .................... 2020-169294

(51) Int. Cl.
*B60M 7/00*    (2006.01)
*B60L 5/00*    (2006.01)
*B60L 9/16*    (2006.01)
*B60L 9/24*    (2006.01)
*B60L 9/30*    (2006.01)
(Continued)

(52) U.S. Cl.
CPC .............. *B60M 7/00* (2013.01); *B60L 5/005* (2013.01); *B60L 9/16* (2013.01); *B60L 9/24* (2013.01); *B60L 9/30* (2013.01); *H02J 7/06* (2013.01); *H02J 50/005* (2020.01); *H02J 50/05* (2016.02); *H02J 50/12* (2016.02); *B60L 13/00* (2013.01); *B60L 2210/12* (2013.01);
(Continued)

(58) Field of Classification Search
CPC ..... B60M 7/00; B60M 2200/00; B60L 5/005; B60L 9/16; B60L 9/24; B60L 9/30; B60L 13/00; B60L 2210/12; B60L 2210/14; B60L 2210/30; H02J 7/00; H02J 7/06; H02J 50/12; H02J 50/005; H02J 50/05; Y02T 10/70; Y02T 10/7072; Y02T 90/14
USPC ......................................................... 191/10
See application file for complete search history.

(56) References Cited

U.S. PATENT DOCUMENTS 10,065,515 B2 * 9/2018 Yasuda .................. B60L 5/005
2012/0248890 A1 * 10/2012 Fukushima ............ H02J 50/12
307/104
(Continued)

FOREIGN PATENT DOCUMENTS

EP     2958213 A1 * 12/2015 ............. H02J 50/05
JP     2002118988 A    4/2002
(Continued)

*Primary Examiner* — S. Joseph Morano
*Assistant Examiner* — James William Jones
(74) *Attorney, Agent, or Firm* — Keating & Bennett, LLP

(57) ABSTRACT

A non-contact power supply system includes an area of AC power supply including a plurality of non-contact power supply devices, a plurality of feeders, and an electrostatic coupler to electrostatically couple at least two non-contact power supply devices to each other.

6 Claims, 6 Drawing Sheets

(51) Int. Cl.
*H02J 7/06* (2006.01)
*H02J 50/00* (2016.01)
*H02J 50/05* (2016.01)
*H02J 50/12* (2016.01)
*B60L 13/00* (2006.01)

(52) U.S. Cl.
CPC ....... *B60L 2210/14* (2013.01); *B60L 2210/30* (2013.01); *B60M 2200/00* (2013.01)

(56) References Cited

U.S. PATENT DOCUMENTS

| | | | |
|---|---|---|---|
| 2013/0009475 A1* | 1/2013 | Nunoya | H02J 50/12 307/43 |
| 2014/0175895 A1* | 6/2014 | Ishi | H02J 50/40 307/104 |
| 2015/0207362 A1* | 7/2015 | Ohnishi | H02J 9/062 307/65 |
| 2017/0222493 A1 | 8/2017 | Oki et al. | |
| 2018/0198287 A1* | 7/2018 | Takikawa | H02J 50/80 |

FOREIGN PATENT DOCUMENTS

| | | | | |
|---|---|---|---|---|
| JP | 2007-050799 A | | 3/2007 | |
| JP | 2013017347 A | | 1/2013 | |
| TW | 201334350 A | * | 8/2013 | ............ B60L 5/005 |
| WO | WO-2016051484 A1 | * | 4/2016 | ............ H02J 50/12 |

* cited by examiner

NON-CONTACT POWER SUPPLY SYSTEM AND TRANSPORTATION SYSTEM

BACKGROUND OF THE INVENTION

1. Field of the Invention

An aspect of the present invention relates to a non-contact power supply system and a transportation system.

2. Description of the Related Art

As a conventional non-contact power supply system, the system described in Japanese Unexamined Patent Publication No. 2007-50799, for example, is known. The non-contact power supply system described in Japanese Unexamined Patent Publication No. 2007-50799 is a non-contact electric power supply facility including a plurality of primary conductive paths laid in sequence along a travel path of a traveling vehicle and a plurality of power supply devices connected to the respective primary conductive paths and configured to supply alternating current, and extracting power from a magnetic field generated by the primary conductive paths to supply the power to the traveling vehicle. The non-contact power supply system has coupling means (power transmission cores) disposed between the respective adjacent primary conductive paths and configured to electromagnetically couple these primary conductive paths.

SUMMARY OF THE INVENTION

The non-contact power supply system employs a configuration in which, when supply of power from one power supply device to one primary conductive path is insufficient (stopped), power is supplied from another power supply device to the one primary conductive path (other system). To achieve this configuration, in the conventional non-contact power supply system, adjacent primary conductive paths are electromagnetically coupled to each other. In this configuration, in order to prevent magnetic field cancellation by coupling means, it is required to substantially synchronize current phases of AC power supplied from the respective power supply devices to the primary conductive paths. Consequently, control has been complicated in the conventional non-contact power supply system.

Preferred embodiments of the present invention provide non-contact power supply systems and transportation systems each capable of supplying power from a non-contact power supply device to feeders in other system with a simple configuration.

A non-contact power supply system according to an aspect of a preferred embodiment of the present invention includes a plurality of feeders provided along a track rail on which a traveling vehicle travels, and a plurality of non-contact power supply devices to supply AC power to each of the feeders to supply power in a non-contact manner to the traveling vehicle traveling on the track rail, in which an area of AC power supply is set to each of the non-contact power supply devices, each of the feeders is provided in the corresponding area, and an electrostatic coupler is included in the non-contact power supply system to electrostatically couple at least two of the non-contact power supply devices to each other.

A non-contact power supply system according to an aspect of a preferred embodiment of the present invention includes an electrostatic coupler with which at least two non-contact power supply devices are electrostatically coupled to each other. As a result, in the non-contact power supply system, for example, even when AC power cannot be supplied from one of the non-contact power supply devices to one of the feeders, the AC power can be supplied from another of the non-contact power supply devices to the one feeders. Thus, the non-contact power supply system according to an aspect of a preferred embodiment of the present invention can supply AC power, with the electrostatic coupler to electrostatically couple at least two of the non-contact power supply devices to each other, to feeders in an area other than the area to be managed. Consequently, in the non-contact power supply system, by using an electrostatic coupling method, there is no need for control to synchronize the current phases of the AC power supplied from each non-contact power supply device to the corresponding feeder. Therefore, the non-contact power supply system can supply power from the non-contact power supply device to feeders in other system with a simple configuration.

In a preferred embodiment, phases of alternating currents flowing through the plurality of feeders do not need to be synchronized with each other. In this configuration, since the phases of alternating currents do not need to be synchronized with each other, there is no need for control to synchronize current phases. Consequently, control is prevented from being complicated.

A housing may be provided to accommodate a plurality of non-contact power supply devices, and an electrostatic coupler may be accommodated inside the housing. In this configuration, since the plurality of non-contact power supply devices are electrostatically coupled in the housing, space saving can be achieved.

A switch may be provided to switch a coupling state and a non-coupling state of electrostatic coupling between one non-contact power supply device and other non-contact power supply device. In this configuration, the coupling state and the non-coupling state of the electrostatic coupling between one non-contact power supply device and other non-contact power supply device can be switched optionally.

Each of the non-contact power supply devices may be provided between an inverter to convert power supplied from a power supply into AC power and the feeder, and may include a filter circuit including a reactor and a capacitor, and an impedance of the electrostatic coupler may be equivalent to an impedance of the filter circuit as viewed from a side of the traveling vehicle receiving supply of the AC power. In this configuration, the impedance of the electrostatic coupler can resonate with the impedance of the feeder. Consequently, transmission efficiency of alternating current can be improved.

A transportation system according to one aspect of a preferred embodiment of the present invention includes the above-described non-contact power supply system, and a traveling vehicle that travels by receiving power transmitted from the non-contact power supply system.

A transportation system according to one aspect of a preferred embodiment of the present invention includes the above-described non-contact power supply system. Consequently, in the transportation system, power can be supplied from a non-contact power supply device to feeders in other system with a simple configuration.

According to an aspect of a preferred embodiment of the present invention, power can be supplied from a non-contact power supply device to feeders in other system with a simple configuration.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments according to the present invention will now be described in detail with reference to the attached drawings. In description of the drawings, like or equivalent elements are designated by like reference signs, and duplicate description is omitted.

Figure 1:
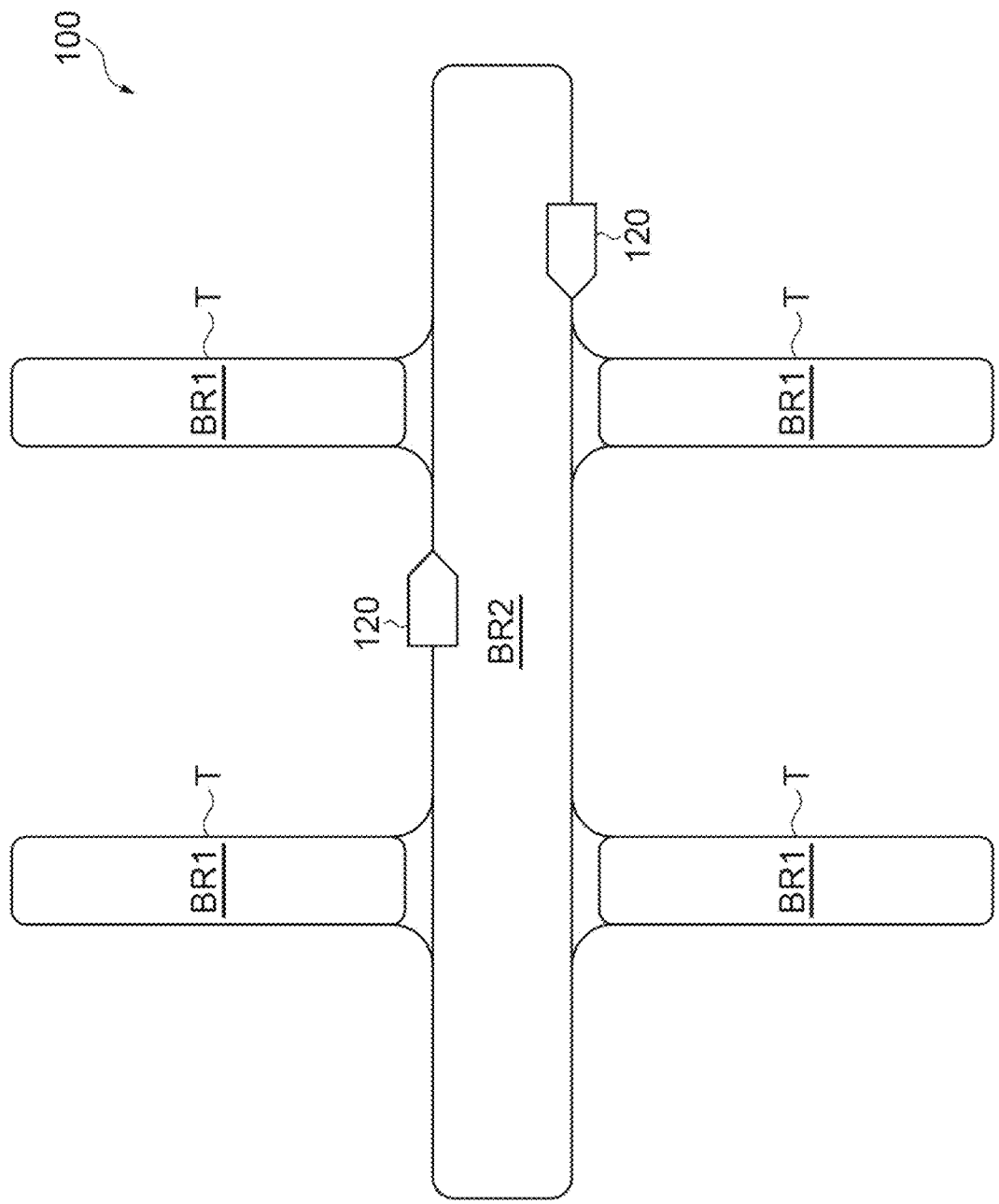
FIG. 1 is a diagram schematically illustrating a track of a transportation system according to a preferred embodiment of the present invention.

As illustrated in FIG. 1, a transportation system 100 is a system configured to convey articles using a ceiling conveyor (traveling vehicle) 120 capable of traveling along a track rail T. The track rail T is a member on which the ceiling conveyor 120 travels and is suspended from a ceiling. In the present preferred embodiment, the track rail T is divided into several (five in an example in FIG. 1) systems (bays). The track rail T includes intrabay routes (areas) BR1, each of which is a runway within a bay, and an interbay route (area) BR2, which is a runway connecting different bays. Each of the intrabay routes BR1 is set such that the ceiling conveyor 120 goes one way in a clockwise direction. Like the intrabay route BR1, the interbay route BR2 is also set such that the ceiling conveyor 120 goes one way in a clockwise direction.

The transportation system 100 includes a non-contact power supply system 110 and the ceiling conveyor (traveling vehicle) 120. In the transportation system 100, power is supplied in a non-contact manner from feeders 12A and 12B provided on the track rail T to the ceiling conveyor 120. The ceiling conveyor 120 drives traveling of the ceiling conveyor 120 or various devices provided in the ceiling conveyor 120 with the supplied power.

The ceiling conveyor 120 includes, for example, a ceiling suspended type crane, an overhead hoist transfer (OHT), and the like. Articles include, for example, containers configured to store a plurality of semiconductor wafers, containers configured to store glass substrates, reticle pods, general components, and the like.

Figure 2:
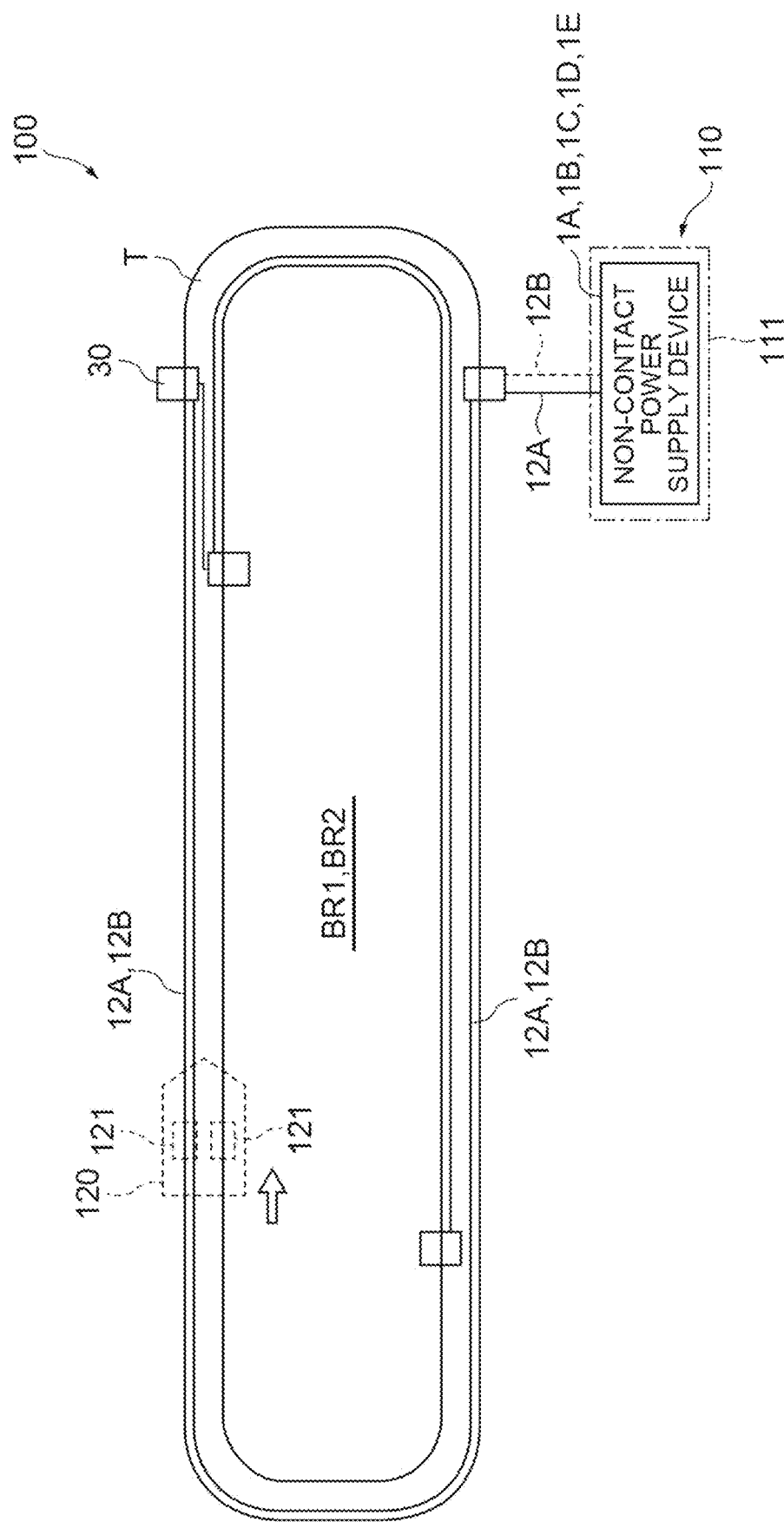
FIG. 2 is a diagram schematically illustrating a configuration of a transportation system.

The track rail T is, for example, an orbital track, as illustrated in FIG. 2. The feeders 12A and 12B are supplied with power from non-contact power supply devices 1A, 1B, 1C, 1D, and 1E. The feeders 12A and 12B are disposed below the track rail T and on at least one of a right side and a left side with respect to the center of the track in a traveling direction of the ceiling conveyor 120. Note that because the feeder 12B is provided below the feeder 12A, the feeder 12B is in a state of being laid below the feeder 12A in FIG. 2.

The feeders 12A and 12B can be rearranged with respect to the track rail T by a switching unit 30. The feeders 12A and 12B are disposed on the left side of the track rail T in an initial area connected to the non-contact power supply devices 1A, 1B, 1C, 1D, and 1E. As the ceiling conveyor 120 travels along the track rail T in the traveling direction, the feeders 12A and 12B are switched in disposition from the left side to the right side of the track rail T by the switching unit 30.

The non-contact power supply system 110 includes the non-contact power supply devices 1A, 1B, 1C, 1D, and 1E. The non-contact power supply devices 1A, 1B, 1C, 1D, and 1E supply power in a non-contact manner to the ceiling conveyor 120. The non-contact power supply devices 1A, 1B, 1C, 1D, and 1E are provided for each of the intrabay routes BR1 and the interbay route BR2. In the present preferred embodiment, each of the non-contact power supply devices 1A, 1B, 1C, and 1D supplies power to the corresponding intrabay route BR1. The non-contact power supply device 1E supplies power to the interbay route BR2. In the present preferred embodiment, the non-contact power supply devices 1A, 1B, 1C, 1D, and 1E are accommodated in a housing 111.

Figure 3:
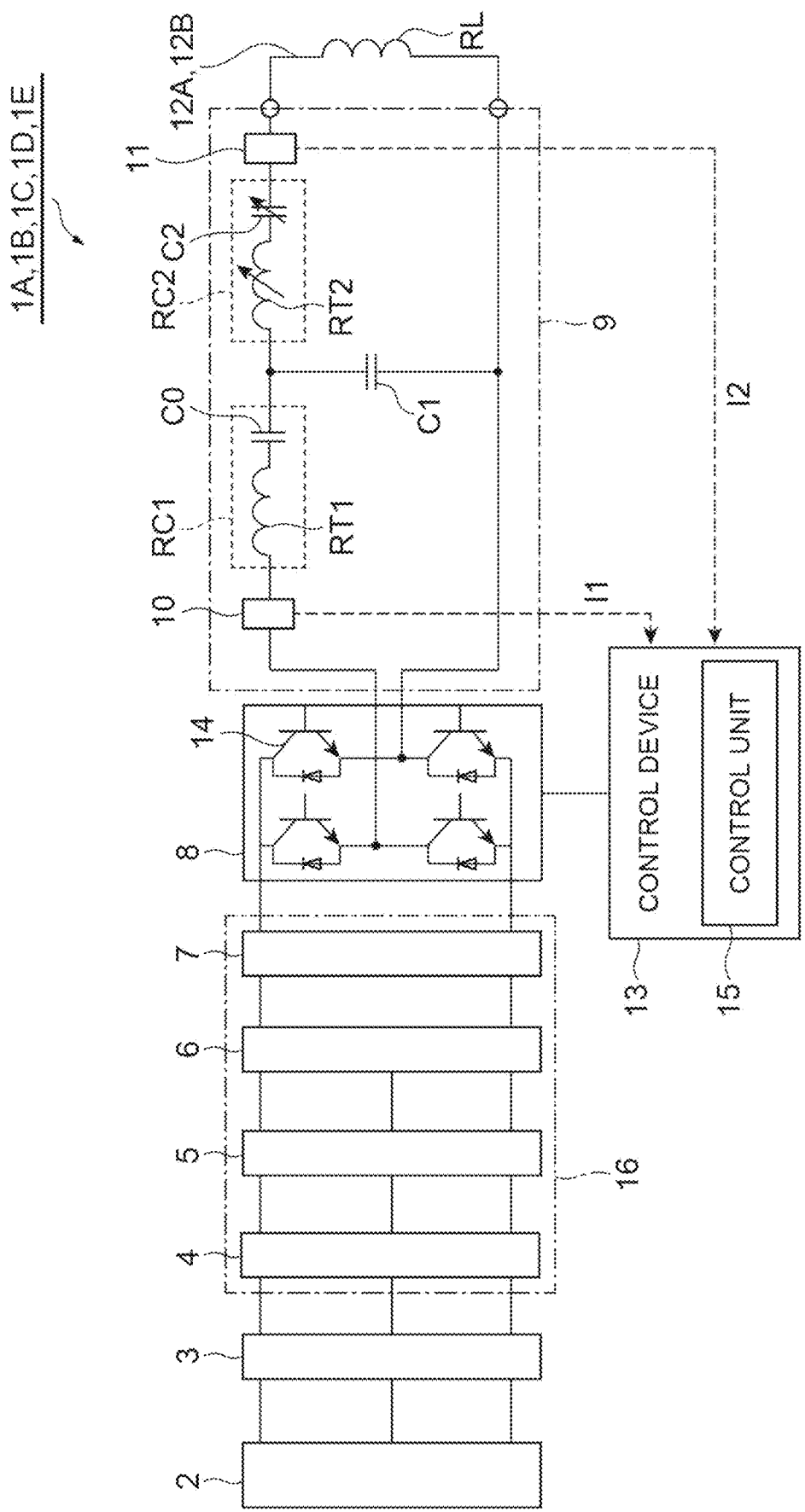
FIG. 3 is a diagram illustrating a configuration of a non-contact power supply device.

As illustrated in FIG. 3, the non-contact power supply devices 1A, 1B, 1C, 1D, and 1E include a power supply 2, a wiring breaker 3, a noise filter 4, a power factor improvement device 5, a rectifier 6, a smoother 7, an inverter 8, a filter circuit 9, a first current sensor 10, a second current sensor 11, feeders 12A and 12B, and a control device 13. The noise filter 4, the power factor improvement device 5, the rectifier 6, and the smoother 7 define a power converter 16.

The power supply 2 is a facility to supply AC power, such as a commercial power supply, and supplies AC power (three-phase 200 V). A frequency of the AC power is, for example, 50 Hz or 60 Hz. The wiring breaker 3 opens an electrical circuit when an overcurrent flows. The noise filter 4 removes noise from the AC power. The noise filter 4 includes a capacitor, for example. The power factor improvement device 5 improves the power factor by bringing an input current closer to a sine wave. The power factor improvement device 5 includes a reactor, for example.

The rectifier 6 converts the AC power supplied from the power supply 2 (power factor improvement device 5) into DC power. The rectifier 6 includes a rectifier element, such as a diode, for example. The rectifier 6 may be a switching element such as a transistor. The smoother 7 smooths the DC power converted in the rectifier 6. The smoother 7 includes an electrolytic capacitor, for example. A voltage converter may further include a step-up/step-down function.

The inverter 8 converts the DC power output from the smoother 7 into AC power and outputs it to the filter circuit 9. The inverter 8 changes the magnitude of the AC power output to the filter circuit 9 by changing the switching frequency based on a control signal output from the control device 13. The inverter 8 includes a plurality of switching elements 14. The switching elements 14 are capable of switching electrical opening and closing. For example, metal oxide semiconductor field effect transistors (MOSFETs), insulated gate bipolar transistors (IGBTs), bipolar transistors, and the like are used as the switching elements 14.

The filter circuit 9 is provided between the inverter 8 and the feeders 12A and 12B. The filter circuit 9 suppresses harmonic noise. The filter circuit 9 includes a reactor RT1, a capacitor C0, a capacitor C0, a reactor RT2, and a capacitor C2.

The reactor RT1 and the capacitor C0 are connected in series to define a first resonant circuit RC1. The reactor RT2 and the capacitor C2 are connected in series to define a second resonant circuit RC2. The first resonant circuit RC1 and the second resonant circuit RC2 are connected in series.

The reactor RT2 is a variable reactor capable of changing (adjusting) a reactor value thereof. The capacitor C2 is a variable capacitor capable of changing a capacitance value thereof. The reactor value (parameter) of the reactor RT2 and the capacitance value (parameter) of the capacitor C2 are set (adjusted), for example, by an operator when equipment of the transportation system 100 is installed. The capacitor C1 is connected in parallel to the first resonant circuit RC1 and the second resonant circuit RC2.

The first current sensor 10 detects a current I1 (inverter current) output from the inverter 8, that is, flowing through the inverter 8. The first current sensor 10 outputs a first current signal indicating the detected current I1 to the control device 13. The second current sensor 11 detects a current I2 (feeding current) of the AC power passing through the second resonant circuit RC2. The second current sensor 11 outputs a second current signal indicating the detected current I2 to the control device 13.

The feeders 12A and 12B include coils configured to supply power in a non-contact manner to the power receiving unit 121 of the ceiling conveyor 120. The feeders 12A and 12B are, for example, litz wires formed by including a plurality of bundles of tens to hundreds of copper wires twisted together, further twisting the bundles together, and covering the outer circumference of the twisted bundles by a tube made of, for example, an insulating material. The feeders 12A and 12B generate magnetic flux when the AC power is supplied from the filter circuit 9. The feeders 12A and 12B have an inductance RL. In the present preferred embodiment, the phases of the alternating currents flowing through the plurality of feeders 12A and 12B are not synchronized with each other.

The control device 13 controls the operation of the inverter 8. The control device 13 is a computer system or a processor implemented in an integrated circuit. The control device 13 includes a central processing unit (CPU), a read only memory (ROM), a random access memory (RAM), and the like, and an input/output interface and the like. The ROM stores various programs or data.

The control device 13 has a control unit 15. The control device 13 is connected to the first current sensor 10 and the second current sensor 11 of the filter circuit 9. The control device 13 inputs the first current signal and the second current signal output from the first current sensor 10 and the second current sensor 11, respectively.

The control unit 15 controls the magnitude of the AC power supplied to the feeders 12A and 12B by controlling the inverter 8, thus controlling the magnitude of power supplied to the ceiling conveyor 120. In the present preferred embodiment, the power control is performed using phase shift control. In the phase shift control, power control parameters are changed to control the magnitude of the AC power. The control unit 15 implements phase shift control to change the magnitude (frequency) of the AC power by changing an ON period of the inverter 8. The control unit 15 uses drive signals supplied to the plurality of switching elements 14 of the inverter 8 to adjust the switching frequency of each switching element 14, and change the ON period of each switching element 14. The power control parameter in the phase shift control is the ON period of each switching element 14 of the inverter 8.

The control unit 15 performs power control so that the value of power transmitted to the ceiling conveyor 120 is a target value based on the first current signal and the second current signal output from the first current sensor 10 and the second current sensor 11, respectively.

Figure 4:
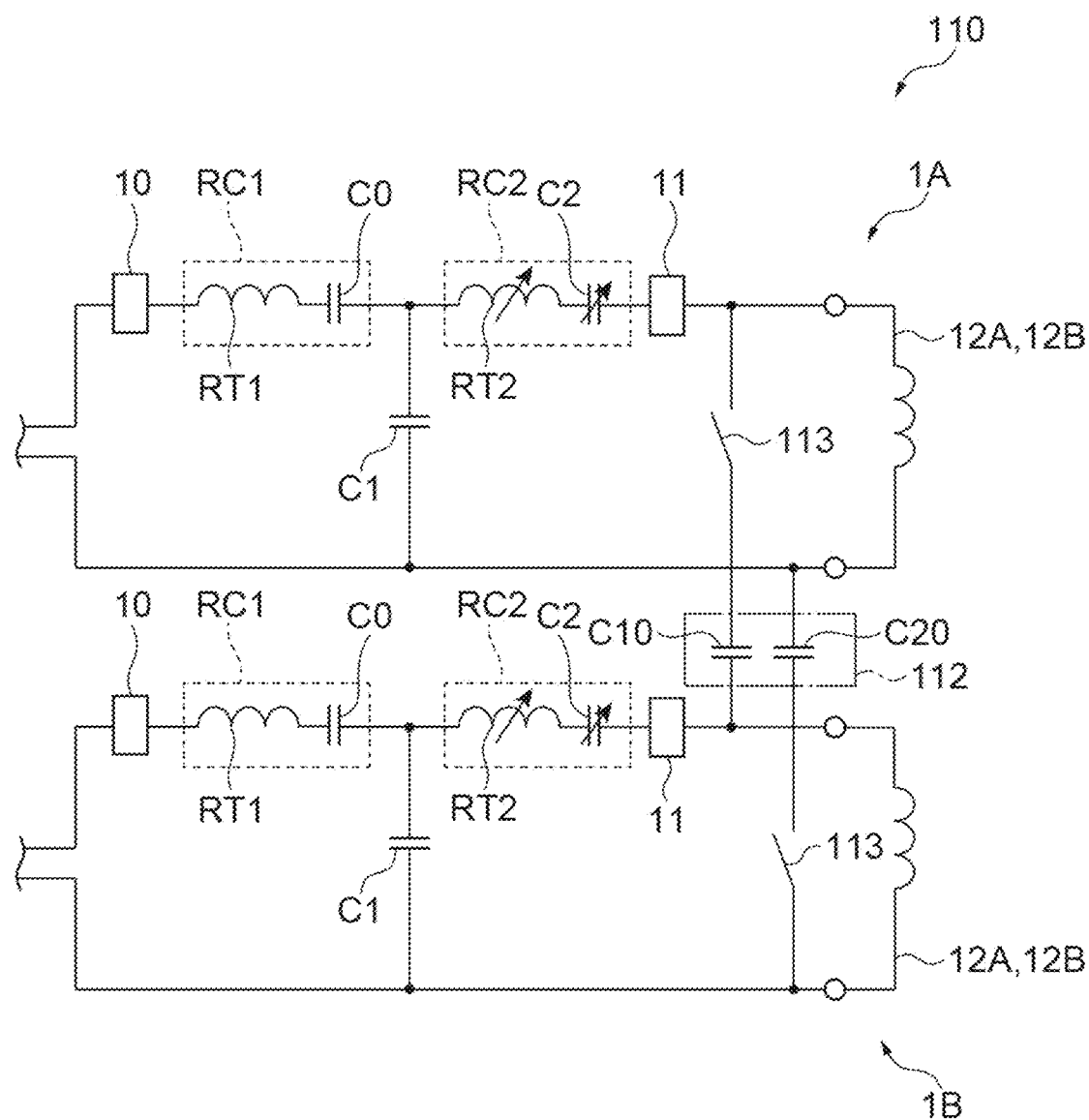
FIG. 4 is a diagram illustrating a configuration of a non-contact power supply system.

In the non-contact power supply system 110, the non-contact power supply devices 1A, 1B, 1C, 1D, and 1E are electrostatically coupled to each other. FIG. 4 illustrates one example of a configuration in which the non-contact power supply device 1A and the non-contact power supply device 1B are electrostatically coupled to each other. As illustrated in FIG. 2 or FIG. 4, the non-contact power supply system 110 further includes a housing 111, an electrostatic coupling unit 112, and a switch (switching unit) 113.

The housing 111 accommodates 1A, 1B, 1C, 1D, and 1E. The housing 111 is installed in a predetermined place at a plant.

The electrostatic coupling unit 112 electrostatically couples the non-contact power supply device 1A to the non-contact power supply device 1B. The electrostatic coupling unit 112 is connected to output ends of the non-contact power supply devices 1A and 1B (ends connected to the feeders 12A and 12B). The electrostatic coupling unit 112 includes a capacitor C10 and a capacitor C20. In other words, the non-contact power supply device 1A and the non-contact power supply device 1B are electrostatically coupled by the capacitors C10 and C20. The electrostatic coupling unit 112 is provided in the housing 111. In other words, the non-contact power supply devices 1A, 1B, 1C, 1D, and 1E are electrostatically coupled to each other in the housing 111. In the present preferred embodiment, all the non-contact power supply devices 1A, 1B, 1C, 1D, and 1E are electrostatically coupled by the electrostatic coupling unit 112.

The electrostatic coupling unit 112 provides supply of alternating current from the non-contact power supply device 1A to the feeders 12A and 12B of the non-contact power supply device 1B, or from the non-contact power supply device 1B to the feeders 12A and 12B of the non-contact power supply device 1A. In the electrostatic coupling unit 112, capacitance of each of the capacitors C10 and C20 is set as appropriate. In the present preferred embodiment, the impedance of the electrostatic coupling unit 112 is set equivalent to the impedance of the second resonant circuit RC2 (feeders 12A and 12B) as viewed from a side of the ceiling conveyor 120 (power receiving side) to which the power is supplied. In other words, the impedance of the electrostatic coupling unit 112 resonates with the impedance of the feeders 12A and 12B.

A switch 113 switches the coupling state and the non-coupling state of the electrostatic coupling between one non-contact power supply device and other non-contact power supply device. In other words, in an example illustrated in FIG. 4, the switch 113 switches ON/OFF of the supply of alternating current from the non-contact power supply device 1A to the feeders 12A and 12B of the non-contact power supply device 1B, or from the non-contact power supply device 1B to the feeders 12A and 12B of the non-contact power supply device 1A. The switch 113 is, for example, a breaker, a magnetic conductor, a semiconductor device such as an IGBT, or the like.

In the non-contact power supply system 110, when the AC power supplied from one non-contact power supply device to one feeders 12A and 12B decreases (voltage drops), the AC power is supplied to the one feeders 12A and 12B from the other non-contact power supply device. In the non-contact power supply system 110, when the switch 113 is turned OFF, the supply of AC power from the non-contact power supply devices 1A, 1B, 1C, 1D, and 1E to feeders 12A and 12B in the other system is stopped.

As illustrated in FIGS. 1 and 2, the ceiling conveyor 120 travels along the track rail T to convey articles. The ceiling conveyor 120 is configured to be capable of transferring articles. The number of units of the ceiling conveyor 120 included in the transportation system 100 is not limited to a particular number, and is two or more.

Figure 5:
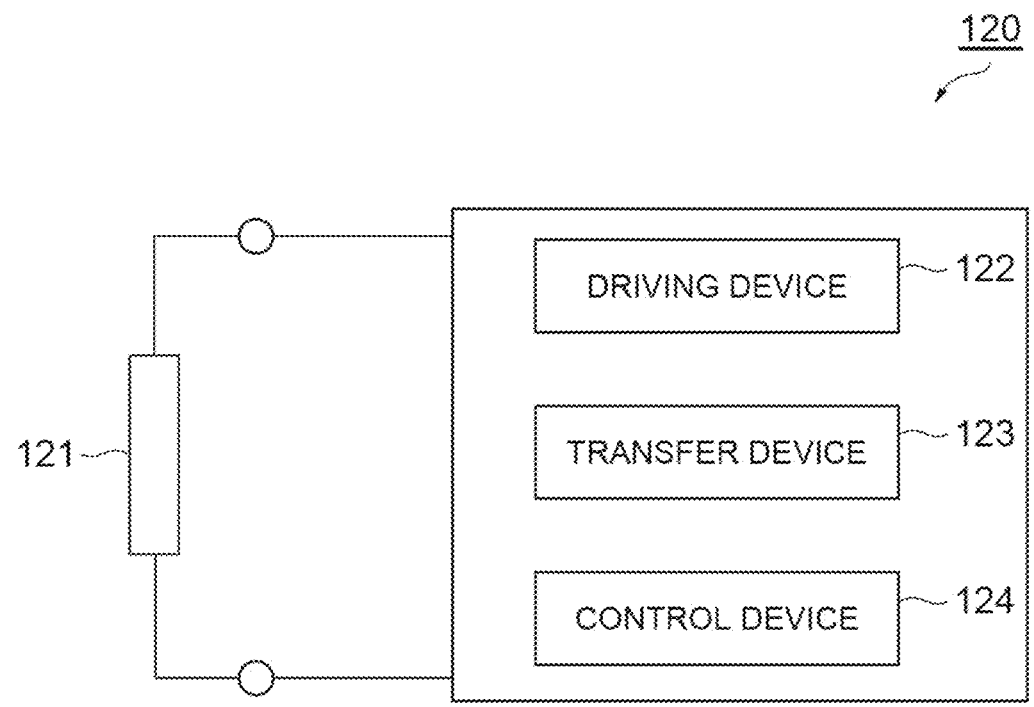
FIG. 5 is a diagram illustrating a configuration of a ceiling conveyor.

As illustrated in FIG. 5, the ceiling conveyor 120 includes a power receiving unit 121, a driving device 122, a transfer device 123, and a control device 124.

The power receiving unit 121 receives power transmitted from the non-contact power supply devices 1A, 1B, 1C, 1D, and 1E in a non-contact manner. The power receiving unit 121 is a coil configured to receive power. Interlinkage of the magnetic flux generated by the feeders 12A and 12B with the power receiving unit 121 generates an AC power in the power receiving unit 121. The power receiving unit 121 supplies the AC power to the driving device 122 and the transfer device 123. A capacitor and a reactor may be connected between the power receiving unit 121 and the driving device 122, and between the power receiving unit 121 and the transfer device 123.

The driving device 122 rotates and drives a plurality of wheels (not illustrated). The driving device 122 uses, for example, an electric motor or a linear motor, or the like, and uses power supplied from the power receiving unit 121 as power for driving.

The transfer device 123 is capable of holding and accommodating articles to be transferred, and transfers the articles. The transfer device 123 includes, for example, a side-unloading mechanism that holds and protrudes articles, an elevating mechanism that moves the articles downward, and the like. By driving the side-unloading mechanism and the elevating mechanism, the transfer device 123 delivers and receives the articles to and from a load port of a storage device such as a stocker or the like that is a transfer destination or a load port of a processing device. The transfer device 123 uses power supplied from the power receiving unit 121 as power for driving.

The control device 124 controls the driving device 122 and the transfer device 123. The control device 124 uses the power supplied from the power receiving unit 121 as the power for driving.

As explained above, the transportation system 100 according to the present preferred embodiment includes the non-contact power supply system 110. The non-contact power supply system 110 includes the electrostatic coupling unit 112 configured to electrostatically couple one non-contact power supply device and other non-contact power supply device. As a result, in the non-contact power supply system 110, even when AC power cannot be supplied from the non-contact power supply device 1A to one feeders 12A and 12B, for example, the AC power can be supplied from the non-contact power supply device 1B to the one feeders 12A and 12B. Thus, in the non-contact power supply system 110, AC power can be supplied to the feeders 12A and 12B outside the area to manage by the electrostatic coupling unit 112 configured to electrostatically couple one non-contact power supply device and other non-contact power supply device. Consequently, in the non-contact power supply system 110, by using the electrostatic coupling method, there is no need for control to synchronize the current phases of the AC power supplied from the respective non-contact power supply devices 1A, 1B, 1C, 1D, and 1E to the feeders 12A and 12B. Therefore, the non-contact power supply system 110 can supply power from the non-contact power supply devices 1A, 1B, 1C, 1D, and 1E to the feeders 12A and 12B in other system with a simple configuration.

With the above-described configuration, in the non-contact power supply system 110, even if AC power cannot be supplied from the non-contact power supply devices 1A, 1B, 1C, 1D, and 1E to the feeders 12A and 12B due to some malfunction in the non-contact power supply devices 1A, 1B, 1C, 1D, and 1E, it is possible to avoid stopping the ceiling conveyor 120 traveling on either of the intrabay route BR1 and the interbay route BR2. Furthermore, in the non-contact power supply system 110, since each of the non-contact power supply devices 1A, 1B, 1C, 1D, and 1E is coupled by the electrostatic coupling method, the device size can be reduced compared to when the non-contact power supply devices are coupled by the electromagnetic coupling method.

In the non-contact power supply system 110 according to the present preferred embodiment, phases of alternating currents flowing through the plurality of feeders 12A and 12B are not synchronized with each other. In this configuration, since the phases of alternating currents do not need to be synchronized with each other, there is no need for control to synchronize current phases. Consequently, it can prevent the control from being complicated.

The non-contact power supply system 110 according to the present preferred embodiment includes the housing 111 in which the plurality of non-contact power supply devices 1A, 1B, 1C, 1D, and 1E are accommodated. The electrostatic coupling unit 112 may be accommodated in the housing 111. In this configuration, since the plurality of non-contact power supply devices 1A, 1B, 1C, 1D, and 1E are electrostatically coupled in the housing 111, space saving can be achieved.

The non-contact power supply system 110 includes the switch 113 configured to switch the coupling state and uncoupled state of electrostatic coupling between one non-contact power supply device and other non-contact power supply device. In this configuration, the coupling state and the non-coupling state of the electrostatic coupling between one non-contact power supply device and other non-contact power supply device can be switched optionally. Consequently, for example, when performing maintenance on one intrabay route BR1, the switch 113 connected to the non-contact power supply device of the one intrabay route BR1 can be turned off to prevent power from being supplied to the ceiling conveyor 120 in the one intrabay route BR1.

In the non-contact power supply system 110 according to the present preferred embodiment, each of the plurality of non-contact power supply devices 1A, 1B, 1C, 1D, and 1E is provided between the inverter 8, which converts the power supplied from the power source 2 to AC power, and the feeders 12A and 12B, and has the second resonance circuit RC2 including the reactor RT2 and the capacitor C2. In the non-contact power supply system 110, the impedance of the electrostatic coupling unit 112 is equivalent to the impedance of the second resonant circuit RC2 as viewed from the side of the ceiling conveyor 120 receiving supply of the AC power. In this configuration, the impedance of the electrostatic coupling unit 112 and the impedance of the feeders 12A and 12B can be resonated. Consequently, transmission efficiency of alternating current can be improved.

Although preferred embodiments according to the present invention have been described above, the present invention is not limited to the above-described preferred embodiments, and various modifications can be made within the scope not departing from the gist of the present invention.

Figure 6:
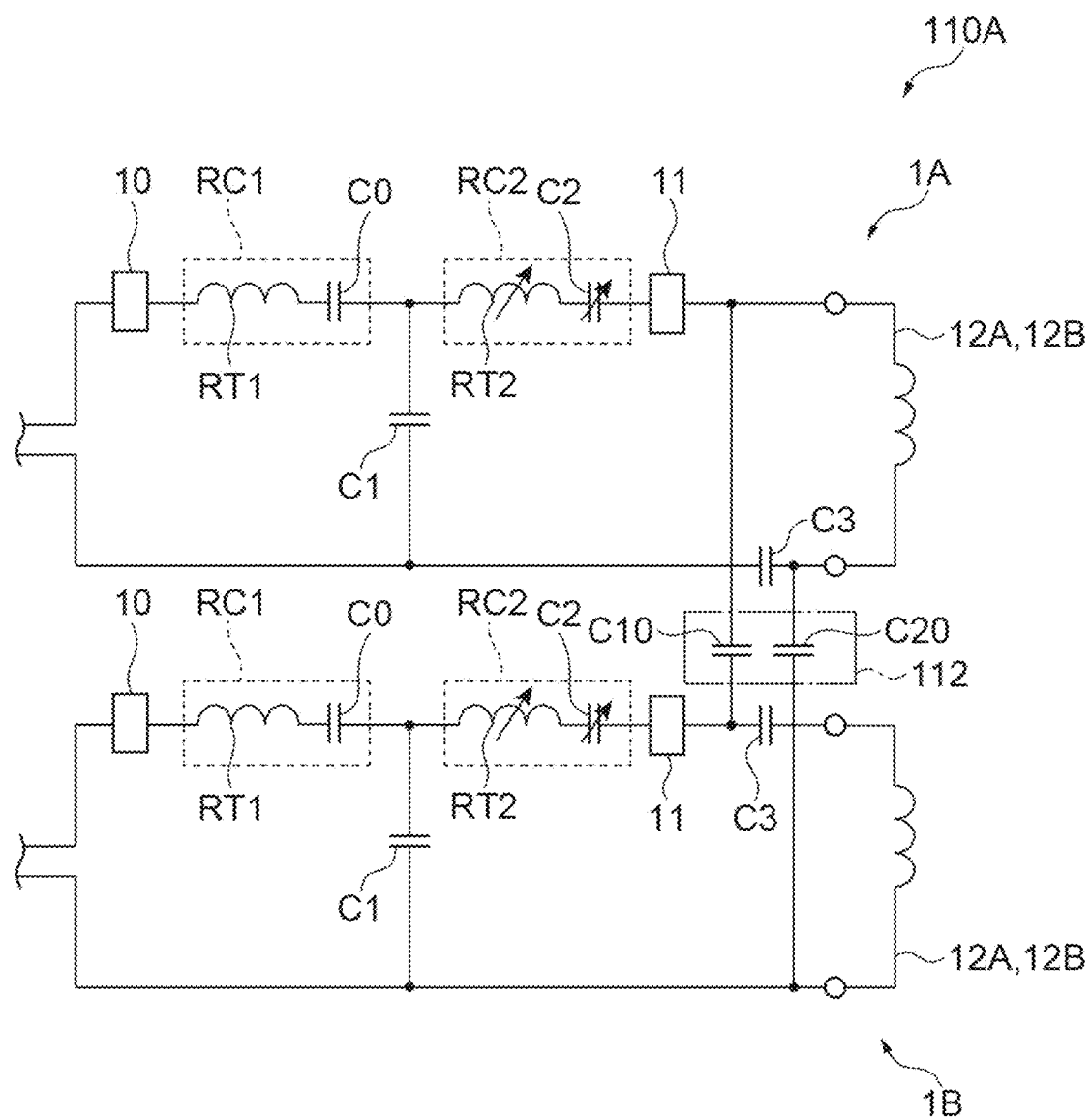
FIG. 6 is a diagram illustrating a configuration of a non-contact power supply system according to another preferred embodiment of the present invention.

In the above preferred embodiments, a form in which the non-contact power supply system 110 includes the switch 113 is described as an example. However, as illustrated in FIG. 6, the non-contact power supply system 110A does not need to include the switch 113. In this configuration, the non-contact power supply devices 1A and 1B include capacitors C3.

In the above-described preferred embodiments, a structural configuration in which all the non-contact power supply devices 1A, 1B, 1C, 1D, and 1E are electrostatically coupled by the electrostatic coupling unit 112 is described as an example. However, in the non-contact power supply system 110, at least two of the plurality of non-contact power supply devices 1A, 1B, 1C, 1D, and 1E need only be electrostatically coupled by the electrostatic coupling unit 112.

In the above-described preferred embodiments, a structural configuration in which the track rail T includes the intrabay routes BR1 and the interbay route BR2 is described as an example. However, the track rail T may be a single orbital track. In this configuration, a single track rail T may be divided into a plurality of areas, and the non-contact power supply devices 1A, 1B, 1C, 1D, and 1E may supply AC power to each area.

In the above-described preferred embodiments, a structural configuration in which the traveling vehicle is the ceiling conveyor 120 is described as an example. However, a moving body is not limited to a ceiling conveyor, but can be any traveling vehicle traveling on the track rail T. For example, the traveling vehicle may be a floor conveyor (floor traveling vehicle). If the traveling vehicle is a floor conveyor, track rails are laid on a floor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A non-contact power supply system comprising:
a plurality of feeders provided along a track rail on which a traveling vehicle travels; and
a plurality of non-contact power supply devices to supply AC power to each of the feeders to supply power in a non-contact manner to the traveling vehicle traveling on the track rail; wherein
an area of AC power supply is set to each of the non-contact power supply devices;
each of the feeders is provided in the corresponding area; and
an electrostatic coupler is included in the non-contact power supply system to electrostatically couple at least two of the non-contact power supply devices to each other.

2. The non-contact power supply system according to claim 1, wherein phases of alternating currents flowing through the plurality of feeders are not synchronized with each other.

3. The non-contact power supply system according to claim 1, further comprising a housing in which the plurality of non-contact power supply devices are accommodated; wherein
the electrostatic coupler is accommodated inside the housing.

4. The non-contact power supply system according to claim 1, further comprising a switch to switch a coupling state and a non-coupling state of electrostatic coupling between the at least two non-contact power supply devices.

5. The non-contact power supply system according to claim 1, wherein
each of the non-contact power supply devices is provided between an inverter to convert power supplied from a power supply into AC power and the feeder, and includes a filter circuit including a reactor and a capacitor; and
an impedance of the electrostatic coupler is equivalent to an impedance of the filter circuit as viewed from a side of the traveling vehicle receiving supply of the AC power.

6. A transportation system comprising:
the non-contact power supply system according to claim 1; and
a traveling vehicle that travels by receiving power transmitted from the non-contact power supply system.

* * * * *